XR 3,046,472 CROSS REFERENCE SEARCH ROO

July 24, 1962 M. J. MANAHAN 3,046,472

RANDOM SWEEP GENERATOR

Filed Jan. 15, 1954 2 Sheets-Sheet 1

Inventor
Max J. Manahan
By R. C. Fowler
Attorney

3046472
OR IN 323/89R

July 24, 1962 M. J. MANAHAN 3,046,472

RANDOM SWEEP GENERATOR

Filed Jan. 15, 1954 2 Sheets-Sheet 2

INVENTOR.
Max J. Manahan
BY
R. C. Fowler
ATTORNEY.

3,046,472
RANDOM SWEEP GENERATOR

Max J. Manahan, Kokomo, Ind., assignor to General Motors Corporation, Detroit, Mich., a corporation of Delaware Filed Jan. 15, 1954, Ser. No. 404,268
8 Claims. (Cl. 323—89)

This invention relates to wave generating means and more particularly to wave generating means which continually varies its frequency between limits in an irregular manner.

In order to interfere with radio communication or radar equipment and prevent the transmittal of intelligence in warfare, jamming means are used. If an independent wave is transmitted of the same frequency as that being used by the communicating, transmitting and receiving means, in an area, the first wave will interfere with the communication and the signal will be unintelligible. Since the exact frequency of operation of enemy apparatus is usually not known, and since each group of communicating stations changes operating frequencies at frequent intervals to maintain secrecy, jamming means cannot be operated on a single frequency. Instead they scan a predetermined band within which it is believed enemy communication or radar sets are operating. Jamming means cannot follow a regular sweep pattern in scanning the band or the enemy may be able to discover the pattern and in turn interfere with or jam the jamming means being operated, so that it is itself, ineffective.

It is therefore an object in making this invention to provide tuning means for an oscillator to vary in a random manner over a prescribed frequency band.

It is a further object in making this invention to provide means for varying the inductance of the tuning coil of an oscillator in a random manner so that the oscillator varies in an indeterminant manner between two limits of frequency.

Figure 1:
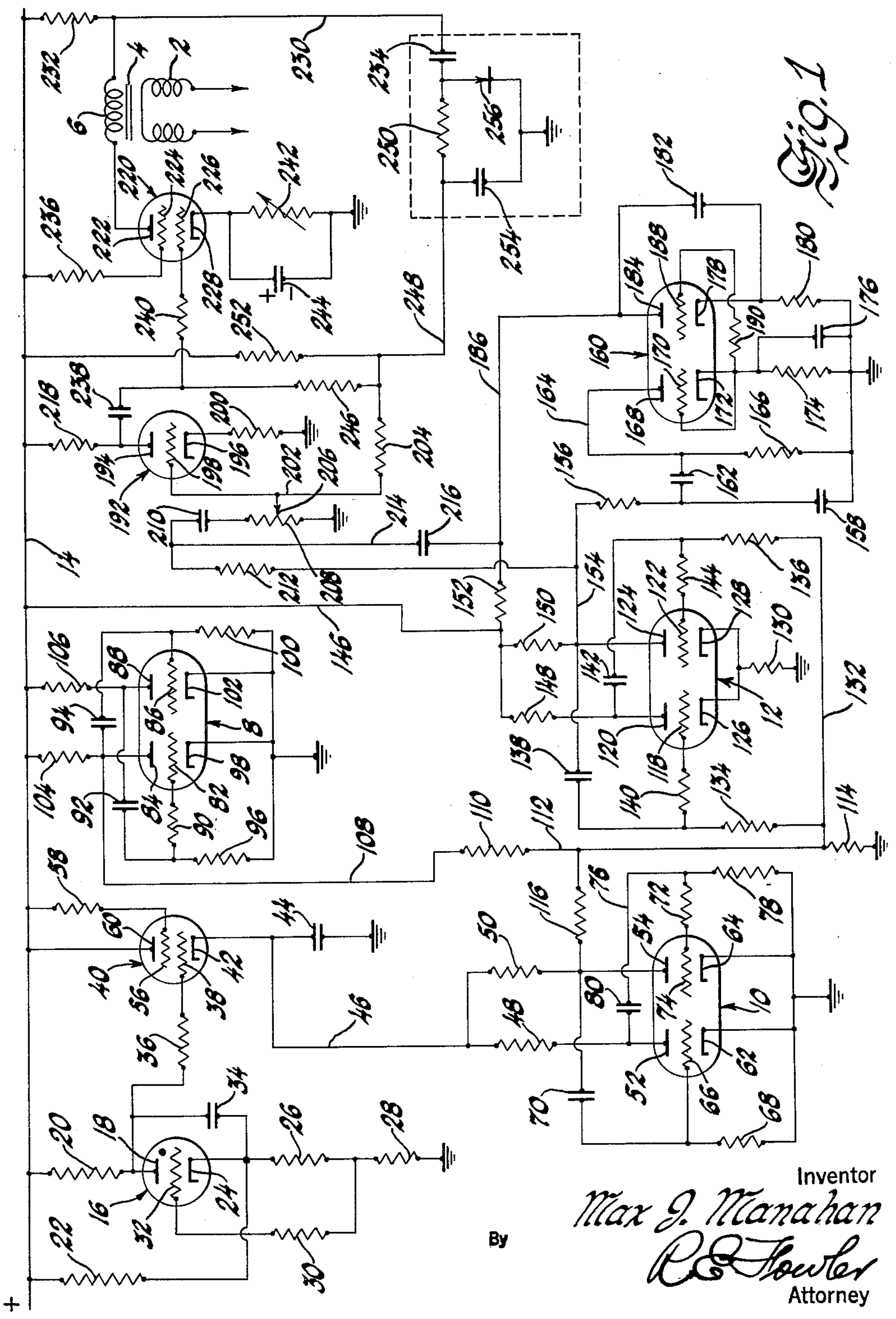
Figure 2:
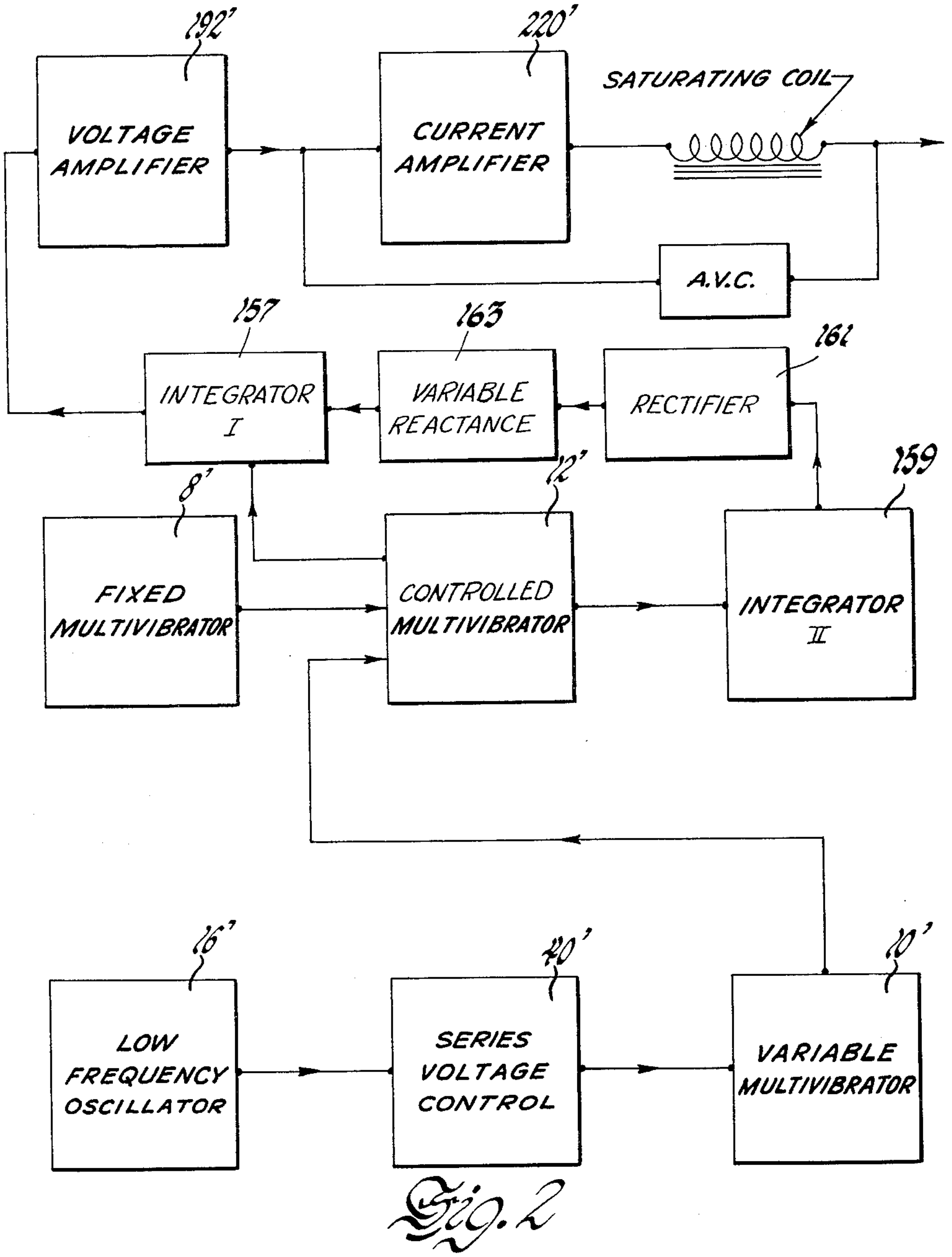

With these and other objects in view which will become apparent as the specification proceeds, my invention will be best understood by reference to the following specification and claims and the illustrations in the accompanying drawing, in which:

FIGURE 1 is a circuit diagram of a wave generating means providing a control circuit for an oscillator coil for a transmitter for jamming purposes; and FIGURE 2 is a block diagram of the jamming circuit.

It is well known that to change the natural or resonant frequency of an electrical circuit including inductance and capacity, either of these reactances may be varied. Many radio receivers are tuned by variable condensers, thus changing the capacitance and tuning the receiver to a new signal. Automobile radio receivers are more commonly tuned by varying the inductance in the resonant circuits, which is accomplished by moving comminuted iron cores with respect to their attendant inductance coils. The inductance of coils can also be varied by changing the magnetic saturation of the core therein and in the present instance this latter method is used for tuning the oscillator. The complete oscillator circuit is not shown but at the upper right-hand corner of the drawing of the oscillator coil 2 is indicated which is connected into the resonant circuit controlling the frequency of the oscillator, which is indicated by arrows. Adjacent to the oscillator coil there is located a core member 4 which has associated therewith a magnetizing coil 6. Thus, changes in the current flow through the magnetizing coil 6 will vary the magnetization of the core 4 and thus tune the oscillator.

The control circuit consists in the main of several multivibrators which provide pulses. This is generally shown in FIGURE 2. The first multi-vibrator section consists of tube 8 and its associated circuit, which multi-vibrator produces a fixed frequency output and is therefore called the "fixed multi-vibrator." A second multi-vibrator consists of the tube 10 and its associated resistance and capacitance circuits. This multi-vibrator varies in wave form amplitude and frequency and will therefore be termed the "variable multi-vibrator"; and lastly, a third multivibrator section that consists of tube 12 with its associated resistance and capacitance circuits, and this multi-vibrator will be termed the "controlled multi-vibrator," since it operates on the combined outputs of the first two multivibrator units. An oscillator including tube 16 supplies a series tube 40 which is connected to a variable multi-vibrator to cause desired variations. A reactance tube 160 whose particular purpose will be later described is connected to the output of the controlled multi-vibrator 12, the main output of which is fed to a voltage amplifier stage 192 and thence through a current amplifier 220, the saturation coil 6 being connected in the output of the latter. The reference characters used for tubes in each section are used with a prime for the blocks of FIG. 2 to indicate the whole section except in the case of the first and second integrator sections, the associated variable reactance and rectifier, which blocks will be given separate reference numerals.

The main power line 14 is connected to a suitable source of high voltage for supplying the control system and a first thyratron tube 16 has its plate 18 connected through dropping resistor 20 to said line 14. This portion forms an oscillator section. A resistor 22 is connected between line 14 and cathode 24 of the tube 16. A pair of resistances 26 and 28 are connected in series between the cathode 24 and ground. A resistor 30 is connected between control grid 32 of the tube 16 and a point intermediate the two series resistors 26 and 28. A condenser 34 is connected directly across the cathode 24 and plate 18. Plate 18 is connected through a resistance 36 to control grid 38 of a second tube 40, called the series tube, since it is connected between the power line 14 and the plates to tube 10. The cathode 42 of the tube 40 is connected through a capacity 44 to ground and also to line 46. Two resistances 48 and 50 are connected in parallel circuits extending from line 46 to plates 52 and 54 of the multivibrator tube 10. A screen grid 56 of the tube 40 is connected through dropping resistor 58 to power line 14 and a plate 60 of tube 40 is directly connected to this line.

Cathodes 62 and 64 of the multi-vibrator tube 10 are directly connected to ground. Grid 66 of the first triode section of the tube 10 is connected to ground through resistance 68 and through condenser 70 with the plate 54 of the second triode section. A resistor 72 is connected between grid 74 of the second triode section of the tube 10 and line 76, which extends from one terminal of a resistor 78 to one side of condenser 80. The opposite side of condenser 80 is connected to plate 52. The opposite side of resistor 78 is grounded.

The fixed multi-vibrator consists of a duo-triode tube 8 having a first grid 82, a first plate 84, a second grid 86 and a second plate 88. A series resistor 90 is connected to grid 82 and to one side of a condenser 92, the opposite side of which is connected to plate 88. A condenser 94 is connected between grid 86 and plate 84. A resistor 96 is connected between control grid 82 through resistor 90 and cathode 98 of the first section which is grounded and in similar manner resistor 100 is connected between grid 86 and cathode 102 of the second triode section which is grounded. A dropping resistor 104 is connected between power line 14 and plate 84 and a dropping resistor 106 is connected between power line 14 and plate 88. Plate 84 is connected through line 108 to one side of a resistor 110. The opposite side of resistor 110 is connected through line 112 with one terminal to a series resistor 114 whose opposite terminal is grounded. A resistor 116 is connected between plate 54 and line 112, line 112 being that upon which the combined output of these two multi-vibrators is applied to the input of the controlled multi-vibrator including tube 12.

This last mentioned multi-vibrator 12' consists of the two triode sections of the tube 12 including a control grid 118 and plate 120 of the first section, and control grid 122 and plate 124 of the second section. The two cathodes 126 and 128 are connected to ground through resistor 130. Line 132 is connected to line 112 and extends to one terminal of resistor 134 and to one terminal of resistor 136. The opposite terminal of resistor 134 is connected to a capacitor 138 and to a resistance 140 in series with control grid 118. Capacitor 138 is connected to plate 124. A condenser 142 is connected between plate 120 and the opposite terminal of resistor 136. A resistor 144 is connected in series with control grid 122 and to an intermediate point between resistance 136 and condenser 142. Tie line 146 extends from power line 14 to one terminal of resistance 148, one terminal of resistance 150 and one terminal of resistance 152. The opposite terminals of resistors 148 and 150 are directly connected to plates 120 and 124 respectively. Line 154 is connected to plate 124 and extends to one terminal of a resistor 156. A condenser 158 is connected between the opposite terminal of resistor 156 and ground.

The output of the controlled multi-vibrator is applied to an integrating section 159 labelled Integrator II on FIG. 2 consisting of resistance 156 and condenser 158 the output of which is connected to a rectifier 161 FIG. 2 and, the rectified voltage then being applied to the second triode section of tube 160 to affect the conductance and act as variable reactance 163 FIG. 2. A coupling condenser 162 is connected to a point between resistor 156 and condenser 158 and to line 164 which extends between one terminal of resistor 166 and plate 168 of the first triode section of tube 160. The opposite terminal of resistor 166 is connected to ground. The grid 170 and cathode 172 of this section are connected together and to ground through resistor 174 shunted by capacitor 176. Thus the first section of tube 160 acts as a diode and rectifies the signal from the integrator 156—158. Cathode 178 of the second triode section of tube 160 is connected to ground through resistor 180. A capacitor 182 is directly connected between the cathode 178 and plate 184. A conductive line 186 connects the plate 184 to a terminal of resistor 152 and to condenser 216. Grid 188 of the second triode section of tube 160 is connected through resistor 190 to cathode 172 of the first section and through this connection the rectified signal is applied to the grid of the second section of the tube 160 to vary the reactance thereof for purposes to be described.

A voltage amplification stage is fed from the output of the controlled multi-vibrator as modified by compound integrating means consisting of Integrator I shown at 157 FIG. 2 and Integrator II including tube 160 and its circuits just described. This stage consists of tube 192 having an anode 194, cathode 196 and grid 198. The cathode is connected through resistor 200 to ground. A conductive line 202 extends between grid 198 and one terminal of a resistor 204. An adjustable tap 206 for resistor 208 is directly connected to line 202. One lead of resistor 208 is grounded and the other is connected to a condenser 210. The opposite terminal of the condenser 210 is connected to one lead of a resistor 212 and to a tie line 214. The other lead of resistor 212 is connected to line 154 to also connect the random frequency output of the multi-vibrator 12 directly to the voltage amplifier 192. Line 214 is connected to one terminal of condenser 216, the opposite terminal of which is connected to line 186. The output signal from line 154 is integrated by Integrator I consisting of resistance 212 and condenser 216 which integrated signal is then applied to grid 198 through adjustable tap 206. It is to be noted that the reactance of the second section of tube 160 is in series with integrating circuit I and, therefore, changes in the reactance of the tube due to variation in the integrated signal through Integrator II will modify the same with changes in frequency. The plate 194 of voltage amplifier tube 192 is connected to power line 14 through dropping resistor 218.

The output of the voltage amplifier tube is connected to a current amplifying stage consisting of the tube 220 having a plate 222, a screen grid 224, a control grid 226 and a cathode 228. The plate 222 is directly connected to one terminal of a saturating inductance coil 6, the opposite terminal of which is connected to line 230 extending between one terminal of resistance 232 and one terminal of condenser 234. The opposite terminal of resistance 232 is connected to power line 14. Screen grid 224 is connected through resistance 236 to power line 14. A series circuit including a condenser 238 and resistance 240 interconnects plate 194 of tube 192 and control grid 226 of the tube 220. Cathode 228 is connected to ground through variable resistance 242, shunted by capacity 244. Resistance 246 is connected between a point intermediate the condenser 238 and resistance 240 and to line 248. Line 248 extends from resistor 204 to resistor 250, the opposite terminal of which is connected to condenser 234. A resistor 252 is connected between line 248 and power line 14. A condenser 254 is connected between line 248 and ground and a rectifier 256 is connected between a point intermediate the resistor 250 and condenser 234 and ground.

In general, the first section of the control circuit including tube 16 is an oscillator having a low frequency output which is applied to the control grid 38 of the series tube 40, varying the conductance through said tube. The voltage of the cathode 42 of the series tube will follow the grid voltage and will vary at the slow frequency of the oscillator. It will be noted that the series tube 40 is in series with the plate supply voltage to the two plates 52 and 54 of the variable multi-vibrator including tube 10. Thus as the thyratron oscillator operates the plate voltage of the multi-vibrator varies between two limits. As stated, the frequency of the oscillator is low and, as an example only, a frequency of .25 cycle per second has been found satisfactory. The system is so designed as to vary the plate voltage of plates 52 and 54 at this frequency by changing the conductance of tube 40. This variation is a sweep up or down depending upon the half cycle under consideration.

The plate voltages of tube 8 of the fixed multi-vibrator, however, are only changed by the normal multi-vibrator action and, therefore, change quickly from one constant value to another, depending upon which half of the tube is conducting. The output of the fixed multi-vibrator is applied to line 108 and is mixed with the constantly varying output of the variable multivibrator including tube 10 at line 112. The combined D.C. voltage appearing on the resistor network can attain nearly all the D.C. levels of voltage between the operating limits. Since the frequencies of the two multivibrators are different, the combined output voltage remains at different D.C. levels for varying intervals of time. This random D.C. output voltage from the resistor network is applied to the controlled multi-vibrator including tube 12 through line 132, and changes the frequency of said controlled multi-vibrator in a random manner.

The output of the controlled multi-vibrator is a square wave, as characteristic of multi-vibrators, and is applied to line 154. If it is integrated through a resistance-capacity coupling to produce a sawtooth sweep wave form, which sawtooth form is desired, the amplitude of the sweep obtained from the resistance-capacitance integrating circuit is inversely proportional to the frequency of the basic square wave. It is desired, however, to keep the sweep amplitude constant regardless of the frequency in order to drive the transmitter oscillator over a fixed band width. Therefore the capacity to be used for integration includes a reactance tube such as the second triode section of tube 160. The impedance of this tube section from plate to ground appears as a capacitance, but its value may be made to vary by changing the plate current of the tube. It is so designed that the effective capacity decreases as the frequency increases which will maintain the output amplitude of the integrated square wave constant.

The output signal from the controlled multi-vibrator appearing on line 154 is integrated through the resistance-capacity network 156—158 and applied to the diode rectifier formed by plate 168 and grid 170-cathode 172 connected together. This rectified signal produces a D.C. voltage which is proportional to the frequency. The D.C. voltage is applied to control grid 188 through resistor 190. By using this D.C. bias on the grid, the plate current in this reactance tube section 178—188—184 will increase as the frequency increases and the effective capacitance will decrease. This tube is in series with condenser 216 of the main integrator section 212—216 which integrates the signal from the controlled multi-vibrator to the voltage amplifier. By proper selection of component values the output sweep amplitude remains nearly constant and is applied to the input of the voltage amplifier stage including tube 192.

The output of the voltage amplifier tube 192 is applied to the input of the current amplifier stage including tube 220 and is connected to control grid 226. The saturation winding 6 of the oscillator coil 2 is connected in the plate circuit of tube 220. The current through said saturation winding, therefore, follows the wave form of the voltage applied to the control grid 226. This change in current through the saturation winding changes the inductance of the oscillator coil associated therewith to tune the oscillator in a random manner over the frequency band desired.

In order to stabilize the operation of the control system, an automatic volume control voltage is fed back from the output circuit of the current amplifier stage and applied to the control grids 198 and 226 of the voltage and current amplifier stages. This is through line 230, filter circuit 234, 250, 252 and line 248. This is primarily intended to compensate for variations in power supply voltage applied to line 14, but it also will compensate for variations in the sweep amplitude.

I have, therefore, provided a control system for an oscillator coil that will cause it to vary continuously in random fashion to provide tuning between prescribed limits of frequency.

I claim:

1. In a control circuit for changing the inductance of a coil, means for producing electrical oscillations of a fixed frequency, means for producing electrical oscillations of varying frequency, multi-vibrator means connected to the combined outputs of the first two oscillation producing means and actuated in accordance with the combined output of the fixed and the variable frequency-producing means, integrating means connected to the output of the multi-vibrator means providing a D.C. voltage that varies with the frequency of the output of the multi-vibrator, voltage amplifying means connected to the integrating means and to the output of the multi-vibrator to amplify said output, current amplifying means connected to the voltage amplifying means, a core for said inductance coil whose effective inductance it is desired to control and means connected to the output of said current amplifying means to saturate the core to change the inductance of the coil.

2. In a control circuit, an inductance coil, a core for said coil, magnetizing means for the core, an oscillator, a multi-vibrator having plate supply circuits, means for connecting said oscillator to said plate voltage supply circuits to vary the plate voltage and provide variable frequency output, a second multi-vibrator producing a fixed frequency, a common mixing means connected to the output of both multi-vibrators producing a combined variable output, amplifying means connected to the output of the mixing means and to the magnetizing means for the core to vary the magnetizing field in conformance with the variable output of the mixing means.

3. In a control circuit, an oscillator, a source of power connected thereto, a grid controlled electronic tube having a cathode, grid and plate, said grid being connected to the output of the oscillator and said plate being connected to the source of power, a multi-vibrator having a plurality of plates, means interconnecting the plates of the multi-vibrator to the cathode of the electronic tube so that the plate voltages are varied by the oscillator to provide a variable frequency output of the multi-vibrator, a source of fixed frequency oscillations, mixing means commonly connected to the output of the multi-vibrator and the source of fixed frequency oscillations, integrating means connected to the output of the mixing means to provide a variable D.C. voltage, amplifying means connected to the integrating means and inductance means connected to the output of the amplifying means, the current through which will vary in accordance with the variations of the D.C. voltage.

4. In a control circuit, an oscillator, a source of power connected thereto, a grid controlled electronic tube having a cathode, grid and plate, said grid being connected to the output of the oscillator and said plate being connected to the source of power, a multi-vibrator having a plurality of plates, means interconnecting the plates of the multi-vibrator to the cathode of the electronic tube so that the plate voltages are varied by the oscillator to provide a variable frequency output of the multi-vibrator, a source of fixed frequency oscillations, mixing means commonly connected to the output of the multi-vibrator and the source of fixed frequency oscillations, integrating means connected to the output of the mixing means to provide a variable D.C. voltage, amplifying means connected to the integrating means, inductance means connected to the amplifying means output, the current through which will vary in accordance with the variations of the D.C. voltage, and stabilizing feedback means connecting the inductive means to the input of the amplifying means.

5. In a control circuit, a source of variable frequency oscillations, a source of fixed frequency oscillations, mixing means commonly connected to the output of each of the oscillation sources and producing oscillations whose frequency is determined by the combination of the two oscillation sources, integrating means connected to the output of the mixing means, said integrating means comprising filtering coupling means, rectifier means connected thereto and a reactance tube comprising an electron tube means having a control grid and plate, said control grid being connected to the output of the rectifier means, the reactance of the tube appearing as capacity and varying with the frequency of the output of the mixing means to maintain relatively constant amplitude of the signal.

6. In a control circuit, an oscillator, a source of electrical power, a multi-vibrator, a tube having a plate, grid and cathode, said plate being connected to said power source, said grid to the oscillator and said cathode to the multi-vibrator so that power supplied to the latter will vary to provide a variable frequency output from the multi-vibrator, a fixed frequency multi-vibrator, a sweep multi-vibrator connected to the output of both the variable and fixed frequency multi-vibrators, integrating means having a predominant capacity effect connected to the output of the sweep multi-vibrator to maintain the amplitude substantially constant as the frequency changes, amplifying means connected to the integrating means, a magnetizable core and a winding associated with said core connected in the output of the amplifier in which the current flow is continuously varying in a random manner.

7. In a control circuit, means for producing a square wave sgnal of variable frequency, an integrating network connected to receive the square wave signal to assist in integrating the same, a rectifier connected to the network to rectify the integrated signal and provide a control bias, a reactance tube comprising an electron tube having a cathode, a grid and plate, said cathode and plate being connected into and forming a part of the integrating network and means interconnecting said grid to the rectifier output so that the reactance of the tube varies with the frequency of the applied waves to maintain substantially constant amplitude of the resultant integrated wave with changes in frequency of said producing means.

8. In a control circuit, means for producing a square wave signal of variable frequency, a main integrating network connected to the means for producing the square wave signal to convert the same to a sawtooth wave of constant amplitude including a first capacitance-resistance filter circuit connected directly to the means for producing a square wave signal, a secondary integrating circuit connected to the means for producing a square wave signal including a second capacitance-resistance filter circuit, a rectifier connected to the second filter circuit and converting the output of the second filter circuit to a D.C. voltage, a reactance tube comprising a triode tube having a plate, cathode and grid, said plate and cathode being connected into the first filter circuit and the tube reactance acting as a component of the main integrating network to maintain the wave amplitude constant, and means connecting said grid to the rectifier to apply the D.C. voltage developed to said grid and change the reactance in the main integrating network with any change in signal frequency.

References Cited in the file of this patent

UNITED STATES PATENTS

| | | |
|---|---|---|
| 1,814,813 | Alexanderson | July 14, 1931 |
| 2,407,270 | Harrison | Sept. 10, 1946 |
| 2,455,472 | Curl | Dec. 7, 1948 |
| 2,666,852 | Hollingsworth | Jan. 19, 1954 |
| 2,675,469 | Harker et al. | Apr. 13, 1954 |
| 2,774,872 | Howson | Dec. 18, 1956 |
| 2,777,955 | Gabor | Jan. 15, 1957 |
| 2,819,017 | Palmer | Jan. 7, 1958 |